3,464,990
BARBITURIC ACID DERIVATIVES SUBSTITUTED
IN THE FIVE POSITION
Arnold Brossi, Verona, Antonino Focella, Clifton, Albert
Israel Rachlin, Verona, and Sidney Teitel, Clifton, N.J.,
assignors to Hoffmann-La Roche Inc., Nutley, N.J., a
corporation of New Jersey
No Drawing. Filed Feb. 27, 1967, Ser. No. 619,030
Int. Cl. C07d 51/20, 51/22; A61k 27/00
U.S. Cl. 260—257          22 Claims

ABSTRACT OF THE DISCLOSURE

Barbituric acid derivatives of the formula

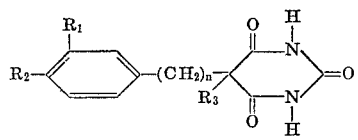

wherein $R_1$ and $R_2$ are hydroxy, lower alkoxy or aralkoxy; $R_3$ is hydrogen, lower alkyl, lower alkenyl or lower alkynyl; and $n$ is an integer from 0 to 2, are prepared, from the correspondingly substituted diethyl(phenyl)malonates. The products are useful as tranquilizers.

BRIEF SUMMARY OF THE INVENTION

The invention relates to novel compounds characterized by the formula

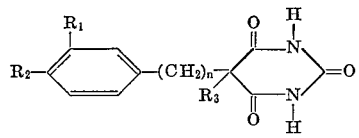

wherein $R_1$ and $R_2$ are independently selected from the group consisting of hydroxy, lower alkoxy and aralkoxy; $R_3$ is selected from the group consisting of hydrogen, lower alkyl, lower alkenyl and lower alkynyl; $n$ is an integer from 0 to 2, and salts thereof with pharmaceutically acceptable bases.

The invention also relates to compounds characterized by the formula

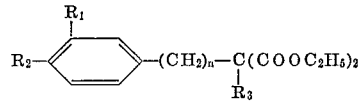

wherein $R_1$, $R_2$, $R_3$ and $n$ are as previously described.

DETAILED DESCRIPTION

As used herein, the term "lower alkoxy" is to be understood to mean a straight or branched alkoxy group having from 1–7 carbon atoms, such as methoxy, ethoxy, propoxy, hexoxy, pentoxy; methoxy being preferred.

The term "lower alkyl" is to be understood to mean a straight or branched chain alkyl group having from 1–7 carbon atoms, such as methyl, ethyl, propyl, isopropyl, butyl, pentyl, hexyl and heptyl; ethyl being preferred.

The term "lower alkenyl" is to be understood to mean alkenyl of 2–7 carbon atoms, such as vinyl, allyl, butenyl, hexenyl, heptenyl; allyl being preferred.

The term "lower alkynyl" is to be understood to mean alkynyl of 2–7 carbon atoms, such as ethynyl, propynyl, butynyl, hexynyl, heptynyl, ethynyl; propynyl being preferred.

The term "aralkoxy" is to be understood to mean aralkoxy of 7–12 carbon atoms; benzyloxy being preferred.

Examples of compounds of this invention corresponding to Formula I are:

5-(3,4-dimethoxyphenyl) barbituric acid;
5-(3,4-dimethoxyphenyl)-5-methyl barbituric acid;
5-(3,4-dimethoxyphenyl)-5-ethyl barbituric acid;
5-(3,4-dimethoxyphenyl)-5-propyl barbituric acid;
5-(3,4-dimethoxyphenyl)-5-isopropyl barbituric acid;
5-allyl-5-(3,4-dimethoxyphenyl)barbituric acid;
5-(3,4-dimethoxyphenyl)-5-(2-propynyl)barbituric acid;
5-(4-benzyloxy-3-methoxyphenyl)-5-(2-propynyl) barbituric acid;
5-(3-benzyloxy-4-methoxyphenyl)-5-ethyl barbituric acid;
5-allyl-5-(4-benzyloxy-3-methoxyphenyl)barbituric acid;
5-ethyl-5-(3-hydroxy-4-methoxyphenyl)barbituric acid;
5-(3,4-diethoxyphenyl)-5-ethyl barbituric acid;
5-allyl-5-(3,4-dimethoxyphenethyl)barbituric acid;
5-(3,4-dimethoxyphenethyl)-5-(2-propynyl)barbituric acid;
5-allyl-5-(4-hydroxy-3-methoxyphenyl)barbituric acid;
5-(4-hydroxy-3-methoxyphenyl)-5-(2-propynyl) barbituric acid; and the like.

Most preferred of these are:

5-(3,4-dimethoxyphenyl)barbituric acid;
5-allyl-5-(3,4-dimethoxyphenyl)barbituric acid;
5-(3,4-dimethoxyphenyl)-5-propynyl barbituric acid; and
5-allyl-5-(3,4-dimethoxyphenethyl)barbituric acid.

Examples of compounds of this invention corresponding to Formula V are:

Diethyl-(3,4-dimethoxyphenyl)malonate,
Diethyl-(3,4-dimethoxyphenyl)-2-propynyl malonate,
Diethyl-(3,4-dimethoxyphenyl)-propyl malonate,
Diethyl-(2,4-diemethoxyphenyl)-ethyl malonate,
Diethyl-(3,4-diethoxyphenyl)-ethyl malonate,
Diethyl-(3,4-dimethoxyphenethyl)malonate, and the like.

The compounds of the invention are prepared by a process which is illustrated by the following reaction scheme:

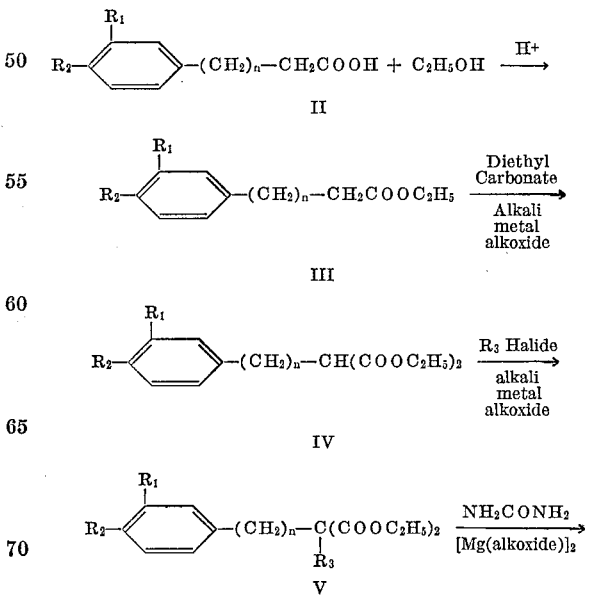

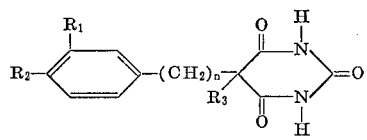

wherein alkoxide is of 1 to 7 carbon atoms, halide is chloride, bromine, or iodine and $R_1$, $R_2$ and $R_3$ are as previously described.

More particularly, in the reaction scheme illustrated above, compounds of Formula II are known compounds or can be prepared by known procedures or modifications thereof. The process for the conversion of said compounds to those of Formula III is also known. The conversion of the acetates of Formula III to the corresponding malonate of Formula IV is accomplished by treating the ester with diethylcarbonate in the presence of sodium ethoxide.

The malonate of Formula IV can be converted to the malonate represented by Formula V untilizing known procedures. For example, a compound represented by Formula IV can be reacted with an $R_3$Halide, such as methylbromide, ethylbromide and the like, in the presence of an alkali metal alkoxide, such as, sodium methoxide, potassium ethoxide, and the like. The temperatures of this alkylation may range from about 25 to about 100° C.; preferably, between about 50° and about 80°. The conversion of the malonate represented by Formula V to the corresponding barbituric acids represented by Formula I can be accomplished by the reaction of a compound of Formula V with urea in the presence of a magnesium alkoxide, such as magnesium methoxide magnesium ethoxide and the like. The temperature at which the malonate is converted to the corresponding barbituric acid may be in the range of 30° C. to 100° C.; preferably, between 50° C. to 80° C.

It is well known that the principal response elicited by known prior art barbiturates is the depression of the central nervous system. This depression may vary from mild sedation to surgical anesthesia, depending upon dosage and the method of administration. Tranquilization produced utilizing previously known barbiturates was thus also accompanied by depression. Unexpectedly, it has been found that the compounds of this invention represented by Formula I elicit tranquilization without depression. In some instances, stimulating behavioral effects are simultaneously produced with tranquilization. The tranquilizing, non-depressant effect is particularly pronounced in squirrel monkeys, facilitating the handling of these valuable experimental animals.

The compounds of Formula I form salts with pharmaceutically acceptable bases and such salts are also within the scope of this invention. Thus, the compounds of Formula I form salts with pharmaceutically acceptable bases which preferably include alkali metal bases such as sodium hydroxide, potassium hydroxide and the like.

The products of the invention can be incorporated into standard pharmaceutical dosage forms, for example, they are useful for oral or parenteral application with the usual pharmaceutical adjuvant material, e.g., organic or inorganic inert carrier materials such as water, gelatin, lactose, starch, magnesium stearate, talc, vegetable oils, gums, polyalkyleneglycols, and the like. The pharmaceutical preparations can be employed in a solid form, e.g., as tables, troches, suppositories, capsules, or in liquid form, e.g., as solutions, suspensions or emulsions. The pharmaceutical adjuvant material can include preservatives, stabilizers, wetting or emulsifying agents, salts to change the osmotic pressure or to act as buffers. They can also contain other therapeutically active materials.

The quantity of active medicament which is present in any of the above-described dosage forms is variable. It is preferred, however, to provide capsules or tablets containing from about 25 mg. to about 100 mg. of the Formula I base or an equivalent amount of a medicinally acceptable base salt thereof. For parenteral administration, it is preferred to provide a solution containing from about 5 mg./ml. to about 25 mg./ml. of the Formula I base, or an equivalent quantity of a salt thereof.

The frequency with which any such dosage form will be administered will vary, depending upon the quantity of active medicament present therein and the needs and requirements of the patient, as diagnosed by the prescribing practitioner. Under ordinary circumstances, however, up to about 5 mg./kg. of the compound can be administered daily in several dosages. It is to be understood, however, that the dosages set forth therein are exemplary only.

The invention will be understood better by reference to the following examples which are given for illustration purposes only. Temperatures, unless otherwise stated, are expressed in degrees centigrade, and parts are by weight.

EXAMPLE 1

Preparation of diethyl-(3,4-dimethoxyphenyl)ethyl malonate

A solution of sodium ethoxide prepared by the addition of 3.54 g. (0.154 mole) of sodium to 64 ml. of absolute ethanol, was added over a period of 2 hours to a mixture of 45.5 g. (0.154 mole) of diethyl-(3,4-dimethoxyphenyl) malonate and 18.3 g. (0.168 mole) of ethyl bromide maintained at 75°. Thereafter, 6.9 g. (0.064 mole) of ethyl bromide were added, and the reaction mixture was refluxed for 2 hours, stored overnight at 25° and the volatiles evaporated. The residue was diluted with 100 ml. of water and the mixture extracted into ether (four 50 ml. portions). The ether extracts were combined, washed and dried. The ether was evaporated and the residual oil fractionally distilled to give 36.4 g. of diethyl-(3,4-dimethoxyphenyl)ethyl malonate, B.P. 121–124° at 0.05 mm.; $n_D^{26}$ 1.5020.

*Analysis.*—Calcd. for $C_{17}H_{24}O_6$: C, 62.94; H, 7.44. Found: C, 62.98; H, 7.53.

EXAMPLE 2

Preparation of 5-ethyl-5-(3,4-dimethoxyphenyl) barbituric acid 6.9 g. (0.284 mole) of magnesium turnings were added to 0.3 ml. of carbon tetrachloride and 100 ml. of methanol. After the magnesium had reacted, 30 g. (0.093 mole) of diethyl-(3,4-dimethoxyphenyl)ethyl malonate and 10.3 g. (0.172 mole) of urea were added and the reaction mixture was stirred, refluxed for 20 hours, cooled, diluted with 90 ml. of water and acidified with 6 N hydrochloric acid. The white precipitate that formed was removed by filtration, washed with water and crystallized from acetonitrile to give 16.4 g. of 5-ethyl-5-(3,4-dimethoxyphenyl)barbituric acid having a melting point of 165–166°.

*Analysis.*—Calcd. for $C_{14}H_{16}N_2O_5$: C, 57.52; H, 5.52. Found: C, 57.83; H, 5.39

EXAMPLE 3

Preparation of 5-allyl-5-(3,4-dimethoxyphenyl) barbituric acid

A solution of 4.6 g. (0.085 mole) of sodium methoxide in 25 ml. of methanol was added over a period of 1 hour to a stirred and refluxing solution of 25 g. (0.085 mole) of diethyl-(3,4-dimethoxyphenyl)malonate and 20.6 g. (0.17 mole) of allyl bromide in 100 ml. of ethyl acetate. The reaction mixture was refluxed for 0.5 hour, cooled, and the solids removed by filtration. The filtrate was washed and dried. The volatiles were evaporated from the residue. 20 g. of the residual oil were added, along with 7.6 g. (0.12 mole) of urea, to magnesium methoxide prepared from 4.6 g. (0.192 mole) of magnesium turnings, 70 ml. of methanol and 0.2 ml. of carbon tetrachloride, and the reaction mixture was refluxed for a period of 20 hours. Thereafter, the mixture was diluted with 100 ml. of ethyl acetate and acidified with 6 N hydrochloric acid. The aqueous layer was separated and re-extracted with 50 ml. of ethyl acetate. The ethyl acetate extracts were combined, cooled to 4° and extracted into 150 ml. of 5 percent sodium hydroxide. The alkaline aqueous phase was immediately separated and acidified with ice cold 6 N hydrochloric acid. The crystalline precipitate that formed was removed by filtration, dried and recrystallized from a mixture of tetrahydrofuran and petroleum ether (30–60°) to yield 12 g. of 5-allyl-5-(3,4-dimethoxyphenyl)barbituric acid having a melting point of 137–139°. The compound also exists in a diamorphic form, melting at 175–177°.

Analysis.—Calcd. for $C_{15}H_{16}N_2O_5$: C, 59.20; H, 5.30. Found: C, 59.05; H, 5.74.

EXAMPLE 4

Preparation of diethyl-(3,4-dimethoxyphenyl)-propyl malonate

To a 250 ml. three-necked flask, equipped with mechanical stirrer, dropping funnel and a reflux condenser topped with $CaCl_2$ drying tube, 45 g. (0.15 g.) of diethyl-(3,4-dimethoxyphenyl) malonate and 20 g. (0.162 mole) of n-propyl bromide were added with stirring. The mixture was heated to reflux and a solution containing 3.5 g. (0.159 mole) of sodium in 50 ml. of absolute ethanol was added thereto dropwise over a period of 3 hours. Heating and refluxing were continued for 2 more hours. Thereafter, the reaction mixture was cooled and 150 ml. of ethyl acetate were added. The solution was washed with three 75 ml. portions of water, dried over sodium sulfate and the solvent removed under reduced pressure. The oily residue boiled at 129–130°/0.12 mm.

EXAMPLE 5

Preparation of 5-(3,4-dimethoxyphenyl)-5-propyl-barbituric acid

In a suitable vessel, 3.45 g. (0.14 mole) of magnesium turnings were stirred and heated to reflux for 2 hours with 35 ml. of methanol and 0.2 ml. of carbon tetrachloride. To this were added 18 g. (0.053 mole) of diethyl-(3,4-dimethoxyphenyl)-5-propyl malonate and 5.15 g. (0.086 mole) of urea with stirring followed by refluxing for 24 hours. The mixture was allowed to cool to room temperature, diluted with 100 ml. of ethyl acetate, and acidified with 6 N hydrochloric acid. The aqueous phase was separated and re-extracted with 45 ml. of ethyl acetate. The ethyl acetate extracts were combined and extracted with two 100 ml. portions of 5 percent NaOH solution. The alkaline solution was quickly separated and acidified with ice cold 6 N hydrochloric acid. The crystalline precipitate was filtered and recrystallized from water and methanol to yield 5-(3,4-dimethoxyphenyl)-5-propyl barbituric acid having a melting point of 155–156°.

EXAMPLE 6

Preparation of 5-(3,4-dimethoxyphenyl)-5-isopropyl barbituric acid 25 g. (0.085 mole) of diethyl-(3,4-dimethoxyphenyl) malonate, 29 g. (0.17 mole) of isopropyliodide and 100 ml. of ethyl acetate were stirred together and refluxed, while a solution of 9.2 g. (0.17 mole) of sodium methoxide dissolved in 55 ml. of methanol was added dropwise over a period of 3 hours. Stirring and refluxing were continued for another 20 hours. The reaction mixture was allowed to cool to room temperature. The inorganic salt that formed was removed by filtration and the filtrate was washed twice with 40 ml. of water, dried over sodium sulfate and the solvent removed under reduced pressure. 12 g. of the oily residue were obtained, which boiled at 151°/0.07 mm.

8 g. (0.024 mole) of the above oily compound and 2.9 g. (0.048 mole) of urea were added to the magnesium methoxide, prepared from 1.8 g. (0.072 mole) of magnesium, 20 ml. of absolute methanol and 0.2 ml. of carbon tetrachloride. The reaction mixture was stirred, refluxed for 20 hours, cooled, diluted with stirring with 100 ml. of ethyl acetate and acidified with 6 N hydrochloric acid. The aqueous phase was separated and re-extracted with 100 ml. of ethyl acetate. The ethyl acetate extracts were combined, cooled and extracted twice with 40 ml. of 5 percent sodium hydroxide. The alkaline solution was quickly separated and acidified with ice cold 6 N hydrochloric acid. The crystalline precipitate was filtered and crystallized from water-methanol to yield 5-(3,4-dimethoxyphenyl)-5-isopropyl barbituric acid having a melting point of 160–162°.

EXAMPLE 7

Preparation of diethyl-(3,4-dimethoxyphenyl)-2-propynyl malonate

To a 250 ml. three-neck flask, equipped with mechanical stirrer, a dropping funnel and a reflux condenser topped with a $CaCl_2$ drying tube, 19 g. (0.064 mole) of diethyl-(3,4-dimethoxyphenyl)malonate, 9.2 g. (0.077 mole) of propargyl bromide and 150 ml. of ethyl acetate were added with stirring. The mixture was heated to reflux and a solution of sodium ethoxide, prepared from 2.2 g. (0.096 mole) of sodium and 45 ml. of absolute ethanol, was added dropwise over a period of 3 hours. Refluxing and stirring were continued for 2 more hours. Thereafter, the inorganic salt which formed was removed by filtration. The solution was washed twice with 50 ml. of water, dried over sodium sulfate and the solvent removed under reduced pressure. The oily residue was crystallized from hexane to yield 14 g. of diethyl-(3,4-dimethoxyphenyl)-2-propynyl malonate having a melting point of 92–93°.

EXAMPLE 8

Preparation of 5-(3,4-dimethoxyphenyl)-5-(2-propynyl) barbituric acid

In a suitable vessel, 2.4 g. (0.1 mole) of magnesium were stirred and heated to reflux for 2 hours with 25 ml. of methanol and 0.2 ml. of carbon tetrachloride. To this were added 12 g. (0.036 mole) of diethyl-(3,4-dimethoxyphenyl)-2-propynylmalonate and 4.4 g. (0.072 mole) of urea with stirring followed by refluxing for 20 hours. The mixture was cooled, diluted with 150 ml. of ethyl acetate and acidified with 6 N hydrochloric acid. The aqueous layer was separated and re-extracted with 180 ml. of ethyl acetate. The ethyl acetate extracts were combined, cooled and extracted with two 100 ml. portions of 5 percent NaOH solution. The aqueous phase was quickly separated and acidified with ice cold 6 N hydrochloric acid. The white precipitate was separated by filtration and crystallized from water to yield 5-(3,4-dimethoxyphenyl)-5-(2-propynyl)barbituric acid having a melting point of 178–180°.

EXAMPLE 9

Preparation of 5-(3,4-dimethoxyphenyl)-5-methyl barbituric acid

A solution containing 9.2 g. (0.17 mole) of sodium methoxide dissolved in 55 ml. of absolute methanol was added over a 2-hour period to a refluxing mixture of 25 g. (0.085 mole) of diethyl-(3,4-dimethoxyphenyl)malonate dissolved in 100 ml. of ethyl acetate and 24.2 g. (0.17 mole) of methyl iodide. Upon completion of the addition, the reaction mixture was allowed to reflux for 2 hours. The reaction mixture was diluted with 100 ml. of ethyl acetate and the precipitate which formed was removed by filtration. The filtrate was first washed with 50 ml. of 5 percent potassium iodide solution and then with 50 ml.

of water. Thereafter, the filtrate was dried over magnesium sulfate, filtered and the solvent was removed under reduced pressure. The oily residue weighed 26 g. Twenty grams (0.0645 mole) of this residue together with 10.2 g. (0.17 mole) of urea, were added to magnesium methoxide, prepared from 6.3 g. (0.26 mole) of magnesium, 65 ml. of absolute methanol and 0.2 ml. of carbon tetrachloride. The reaction mixture was stirred and refluxed for 20 hours. Thereafter, the reaction mixture was allowed to cool to room temperature, diluted with 100 ml. of ethyl acetate and acidified with 6 N hydrochloric acid. The aqueous layer was separated and re-extracted with 50 ml. of ethyl acetate. The ethyl acetate extracts were combined, cooled and extracted with two 80 ml. portions of 5 percent sodium hydroxide. The aqueous solution was quickly separated and acidified with ice cold 6 N hydrochloric acid. The crystalline precipitate was removed by filtration and crystallized from water to yield 5-(3,4-dimethoxyphenyl)-5-methyl barbituric acid having a melting point of 214–215°.

EXAMPLE 10

Preparation of 5-(3,4-dimethoxyphenyl) barbituric acid

To 3.2 g. (0.132 mole) of magnesium turnings, 0.3 ml. of carbon tetrachloride and 35 ml. of absolute methanol were added. After the magnesium had reacted, 13 g. (0.044 mole) of diethyl-(3,4-dimethoxyphenyl)malonate and 5.3 g. (0.088 mole) of urea were added. The resulting reaction mixture was stirred and refluxed for 20 hours. Thereafter, the reaction mixture was cooled to room temperature, diluted with 100 ml. of ethyl acetate and acidified with 6 N hydrochloric acid. The formed crystalline precipitate was removed by filtration under suction and crystallized from water-acetic acid to yield 5-(3,4-dimethoxyphenyl)barbituric acid having a melting point of 264–266°.

EXAMPLE 11

Preparation of ethyl-3-benzyloxy-4-methoxyphenylacetate 52.5 g. (0.193 mole) of 3-benzyloxy-4-methoxyphenyl acetic acid were dissolved in 400 ml. of ethyl alcohol and 11.3 ml. of concentrated sulfuric acid and refluxed with stirring over a period of 10 hours. Thereafter, the reaction mixture was concentrated, dissolved in 600 ml. of ether, washed with two 50 ml. portions of ice water and two 50 ml. portions of 5 percent sodium carbonate, dried over sodium sulfate, filtered and freed of the solvent by distillation under reduced pressure. The residue was crystallized from petroleum-ether, B.P. 30–60° to yield 40.9 g. of ethyl-3-benzyloxy-4-methoxyphenylacetate having a melting point of 66–67°.

EXAMPLE 12

Preparation of 5-(3-benzyloxy-4-methoxyphenyl)-5-ethyl barbituric acid

To a solution of 40.9 g. (0.136 mole) of ethyl-(3-benzyloxy-4-methoxyphenyl)acetate in 100 ml. of diethylcarbonate stirred, and heated to 115–120°, 3.13 g. (0.136 mole) of sodium were added in small pieces over a period of 1 hour. When the addition was completed, stirring and heating were continued for an additional hour, and the alcohol formed during the reaction was removed by distillation. The reaction mixture was cooled to 80° and excess diethylcarbonate was removed under reduced pressure. Thereafter, the mixture was cooled in ice bath, poured into ice water and acidified with 6 N hydrochloric acid. The resulting oily layer was separated and the remaining aqueous solution extracted with 100 ml. of ether. The ether extracts were combined with the oil, washed once with 50 ml. of 5 percent sodium carbonate solution and twice with 75 ml. of water. The organic phase was separated, dried over magnesium sulfate, filtered and the solvent distilled under reduced pressure. The residue was crystallized from ether-petroleum ether, B.P. 30–60°, to yield 30 g. of crystalline compound.

30 g. (0.08 mole) of the above crystalline material was dissolved in 50 ml. of ethyl acetate and placed into a 250 ml. three-neck flask, equipped with mechanical stirrer, a dropping funnel and a Dry Ice condenser topped with a CaCl₂ tube. To this solution were added with stirring 10.8 g. (0.1 mole) of ethyl bromide. Thereafter, while a solution of sodium ethoxide, prepared by the addition of 1.84 g. (0.08 mole) of sodium to 35 ml. of absolute ethanol, was added dropwise over a period of 2 hours. The solution was heated to and maintained at 40–45°. Stirring and heating were continued for 2 more hours. Whereupon, the reaction mixture was cooled to room temperature, filtered from the inorganic salt, washed twice with 40 ml. of water, dried over sodium sulfate, filtered and the solvent removed under reduced pressure. The resulting oily substance weight was 22 g.

In a suitable vessel, 6 g. (0.24 mole) of magnesium were stirred with 70 ml. of absolute methanol and 0.3 ml. of carbon tetrachloride at reflux temperature over a 1-hour period. To this were added 20 g. (0.05 mole) of the above (22 g.) oily substance and 8 g. (0.133 mole) of urea. The resulting reaction mixture was stirred, refluxed for 20 hours, cooled, diluted with 100 ml. of ethyl acetate and acidified with 6 N hydrochloric acid. The aqueous phase was separated and re-extracted with 100 ml. of ethyl acetate. The ethyl acetate extracts were combined, cooled and extracted twice with 80 ml. of 5 percent sodium hydroxide. The alkaline solution quickly was separated and acidified with ice cold 6 N hydrochloric acid. The crystalline precipitate was removed by filtration and crystallization from water-methanol gave 4.6 g. of 5-(3-benzyloxy-4-methoxyphenyl)-5-ethyl barbituric acid, melting at 172–174°.

EXAMPLE 13

Preparation of 5-(3-hydroxy-4-methoxyphenyl)-5-ethyl barbituric acid 100 mg. of 5-(3-benzyloxy-4-methoxyphenyl)-5-ethyl barbituric acid were dissolved in 6 ml. of ethanol and 4 ml. of 20 percent hydrochloric acid was added. The reaction mixture was refluxed for 1 hour, the solvent removed under reduced pressure, and the solid residue was crystallized from water. Pure 5-(3-hydroxy-4-methoxyphenyl)-5-ethyl barbituric acid melted at 213–215°.

EXAMPLE 14

Preparation of diethyl-(3,4-diethoxyphenyl) malonate

To a solution of 32.2 g. (0.128 mole) of ethyl-3,4-diethoxyphenylacetate and 80 ml. of diethylcarbonate which was stirred and heated to 115–120°, 2.95 g. (0.128 mole) of sodium were added in small pieces over a period of one hour. When the addition was completed, stirring and heating was continued for an additional hour while the alcohol formed during the reaction was allowed to distill. The reaction mixture was cooled to 80° and the excess of diethylcarbonate was removed under reduced pressure. The mixture was cooled on ice bath, was poured into ice water and acidified with 6 N hydrochloric acid. The oily layer was separated and the remaining aqueous solution extracted with 100 ml. of ether. The ether extract was combined with the oil and washed once with 50 ml. of 5 percent sodium carbonate solution and twice with 75 ml. of water. The organic phase was separated, dried over magnesium sulfate and the solvent removed under reduced pressure. 24.5 g. of the oily residue, diethyl(3,4-diethoxyphenyl)malonate, boiled at 124–126°/0.02 mm.

EXAMPLE 15

Preparation of diethyl-(3,4-diethoxyphenyl)ethyl malonate

Into a 250 ml. three neck flask, equipped with mechanical stirrer, a dropping funnel and a Dry Ice reflux condenser, topped with a CaCl₂ tube, 24.5 g. (0.075 mole) of diethyl-(3,4-diethoxyphenyl)malonate, 11 g. of ethyl bromide and 150 ml. of ethyl acetate were stirred and heated to 40–45°. Thereafter, a solution of sodium ethoxide, prepared by the addition of 1.75 g. (0.076 mole) of sodium to 25 ml. of absolute ethanol, was added to the reaction mixture dropwise over a period of 3 hours. Stirring and heating were continued for 3 more hours. The reaction mixture was allowed to cool to room temperature. The inorganic salts that formed were filtered out and the filtrate was washed twice with 40 ml. of water, dried over sodium sulfate and the solvent removed under reduced pressure. 9.7 g. oily residue, diethyl-(3,4-diethoxyphenyl)ethyl malonate, boiled at 143°/0.02 mm.

EXAMPLE 16

Preparation of 5-(3,4-diethoxyphenyl)-5-ethyl barbituric acid

Utilizing the equipment of Example 15, 2.84 g. (0.117 mole) of magnesium were stirred with 30 ml. of absolute methanol and 0.2 ml. of carbon tetrachloride for 1 hour at a refluxing temperature. 10 g. (0.051 mole) diethyl-(3,4-diethoxyphenyl)ethyl malonate and 4.25 g. (0.071 mole) of urea were added. The resulting reaction mixture was stirred and refluxed for 20 hours, cooled and diluted with stirring with 100 ml. of ethyl acetate, and acidified with 6 N hydrochloric acid. The aqueous phase was separated and re-extracted with 100 ml. of ethyl acetate. The ethyl acetate extracts were combined, cooled and extracted twice with 80 ml. of 5 percent NaOH solution. The alkaline solution was quickly separated and acidified with ice cold 6 N HCl. The crystalline precipitate was filtered and crystallized from water-methanol to yield 6.3 g. of 5-(3,4-diethoxyphenyl)-5-ethyl barbituric acid melting at 138–139°.

EXAMPLE 17

Preparation of diethyl-(3,4-dimethoxyphenethyl) malonate

To a 500 ml. 3-neck flask, fitted with a reflux condenser, a dropping funnel and a mechanical stirrer containing 250 ml. of absolute alcohol, 10.4 grams (0.45 mole) of clean sodium, cut into small pieces, were gradually added. The sodium ethoxide solution formed was stirred and cooled to about 50° and 72 g. (0.45 mole) of diethyl malonate was added slowly through the dropping funnel. To the clear solution were added gradually 118 g. (0.45 mole) of 3,4-dimethoxyphenethyl bromide. The reaction mixture was heated for 3 hours. Thereafter, cooled and the solvent removed in vacuo. The oily residue dissolved in 500 ml. of ether was washed with two 150 ml. portions of water. The ether solution was dried over Na₂SO₄ and distilled under reduced pressure. The oily residue of diethyl-(3,4-dimethoxyphenethyl)malonate boiled at 149°/0.05. Yield 33 g.

EXAMPLE 18

Preparation of 5-allyl-5-(3,4-dimethoxyphenethyl) barbituric acid

To a stirred and refluxing solution of 17.5 g. (0.05 mole) of diethyl-(3,4-dimethoxyphenethyl)malonate and 7.2 g. (0.06 mole) of allyl bromide in 250 ml. of ethyl acetate, a solution of 4.9 grams (0.06 mole) of sodium ethoxide dissolved in 40 ml. of absolute alcohol was added over a 2-hour period. The resulting mixture was refluxed for 4 hours, cooled and the inorganic salt removed by filtration. The filtrate was washed with water, dried over Na₂SO₄ and the solvent distilled in vacuo. The oil residue, 15.2 g. and 5.1 g. of urea added to magnesium methoxide, prepared from 5.0 g. (0.2 mole) of magnesium turning, 35 ml. of methanol and 0.2 ml. of carbon tetrachloride were refluxed for a period of 20 hours. The reaction mixture was diluted with 250 ml. of ethyl acetate and acidified with 6 N hydrochloric acid. The aqueous layer was separated and re-extracted with 50 ml. of ethyl acetate. The ethyl acetate extracts were combined, cooled to 4° and extracted with two 100 ml. portions of 5 percent NaOH. The alkaline aqueous phase was immediately separated and acidified with ice cold 6 N hydrochloric acid. 9 g. of the crystalline precipitate formed. After recrystallization from methanol and water, 5-allyl-5-(3,4-dimethoxyphenethyl)barbituric acid melted at 172–174°.

EXAMPLE 19

Preparation of 5-(3,4-dimethoxyphenethyl)-5-(2-propynyl)barbituric acid

To a stirred and refluxing solution of 17.5 g. (0.05 mole) of diethyl-(3,4-dimethoxyphenethyl)malonate and 7.15 g. (0.06 mole) of propargyl bromide in 250 ml. of ethyl acetate, a solution of sodium ethoxide, freshly prepared by dissolving 1.4 g. of sodium in 40 ml. of absolute alcohol was added over a period of 2 hours. The reaction mixture was refluxed for a period of 3 hours, cooled and the inorganic salt removed by filtration. The filtrate was washed with two 50 ml. portions of H₂O, dried over Na₂SO₄ and the solvent distilled in vacuo. The oil residue, 18.5 g. and 5.1 g. of urea were added to magnesium methoxide, prepared from 5.0 g. (0.2 mole) of magnesium turning and 35 ml. of methanol and 0.2 ml. of carbon tetrachloride. The reaction mixture was refluxed for a period of 20 hours. Thereafter, cooled, diluted with 250 ml. of ethyl acetate and acidified with 6 N hydrochloric acid. The aqueous layer was separated and re-extracted with 50 ml. of ethyl acetate. The ethyl acetate extracts were combined, cooled to 4° and extracted with two 100 ml. portions of 5 percent NaOH. The alkaline solution was immediately separated and acidified with ice cold 6 N hydrochloric acid. The crystalline precipitate was removed by filtration and dried. Yield 5 g. After crystallization from methanol and water, 5-(3,4-dimethoxyphenethyl)-5-(2-propynyl)barbituric acid melted at 185–187°.

EXAMPLE 20

Preparation of 5-(allyl)-5-(4-benzyloxy-3-methoxyphenyl)barbituric acid

To a solution of 53 g. (0.195 mole) of methyl-4-benzyloxy-3-methoxyphenyl acetate and 150 ml. of diethylcarbonate stirred and heated to 115–120°, 4.6 g. (0.2 mole) of sodium were added in small pieces over a period of one hour. When the addition was completed, stirring and heating were continued for an additional hour and the alcohol formed during the reaction was allowed to distill. The reaction mixture was cooled to 80° and the excess of diethylcarbonate was removed under reduced pressure. The mixture was cooled in ice bath, poured into ice water and acidified with 6 N hydrochloric acid. The oily layer was separated and the remaining aqueous solution extracted with two 100 ml. portions of ether. The ether extracts were combined with the oil, washed once with 50 ml. of 5 percent sodium carbonate solution and twice with 75 ml. of water. The organic phase was separated, dried over sodium sulfate, filtered and the solvent removed under reduced pressure to yield 60 g. of oily compound. Sixty grams (0.168 mole) of the above oil were dissolved in 200 ml. of ethyl acetate. To the resulting solution, 25 g. (0.206 mole) of allyl bromide were added. While the solution was refluxing on heating mantle, a solution of sodium methoxide prepared from 10.8 g. (0.206 mole) of solid sodium methoxide dissolved in 40 ml. of absolute methanol was added over a period of 1½ hours. Upon completion of the addition, stirring and refluxing were continued for 2 more hours. The reaction mixture was allowed to cool to room temperature and was washed twice with 100 ml. of water, dried over sodium sulfate, filtered and the solvent removed under reduced pressure. The oily substance which was obtained weighed 61 g.

12 g. (0.5 mole) of magnesium were stirred with 120 ml. of absolute methanol and 0.5 ml. of carbon tetrachloride for 1 hours at reflux temperature. 61 g. (0.153 mole) of the oily compound obtained in the previous reaction were added with 20 g. (0.335 mole) of urea to the prepared magnesium methoxide. The reaction mixture was stirred and refluxed for 20 hours, cooled, with stirring, diluted with 100 ml. of ethyl acetate and acidified with 6 N hydrochloric acid. This resulted in the precipitation of a yellowish substance, which was filtered, crystallized from water-methanol to yield 40 g. of white crystalline 5-(allyl)-5-(4-benzyloxy-3-methoxyphenyl)barbituric acid melting at 217–219°.

EXAMPLE 21

Preparation of 5-(4-benzyloxy-3-methoxyphenyl)-5-(2-propynyl)barbituric acid

To a solution of 25 g. (0.088 mole) of methyl-4-benzyloxy-3-methoxyphenyl acetate and 75 ml. of diethylcarbonate stirred and heated to 115–120°, 2.3 g. (0.1 mole) of sodium were added in small pieces over a period of 1 hour. When the addition was completed, stirring and heating were continued for an additional hour. The alcohol formed during the reaction was allowed to distill. The reaction mixture was cooled to 80° and the excess of diethylcarbonate was removed under reduced pressure. The mixture was cooled, poured into ice water and acidified with 6 N hydrochloric acid. The oily layer was separated and the remaining aqueous solution extracted with two 100 ml. portions of ether. The ether extracts were combined with the oil and washed once with 50 ml. of 5 percent sodium carbonate solution and twice with 75 ml. of water. The organic phase was separated, dried over magnesium sulfate, filtered and the solvent removed under reduced pressure to yield 27 g. of oily compound. Twenty-seven grams (0.076 mole) of the above oil were dissolved in 100 ml. ethyl acetate, placed into a 500 ml. three-neck flask, equipped with mechanical stirrer. To this solution, 10.8 g. (0.091 mole) of propargyl bromide were added. The mixture was refluxed on heating mantle while a solution of sodium methoxide prepared from 4.9 g. (0.091 mole) of sodium methoxide dissolved in 20 ml. of absolute methanol was added over a period of one hour. Stirring and refluxing were continued for 3 more hours. The reaction mixture was allowed to cool to room temperature and was washed twice with 100 ml. of water. The aqueous phases were combined and extracted with 150 ml. of ethyl acetate. The ethyl acetate phases were combined and dried over sodium sulfate, filtered and the solvent was removed under reduced pressure. The oily residue weighed 27 g.

Five grams (0.23 mole) of magnesium were stirred with 50 ml. of absolute methanol and 0.2 ml. of carbon tetrachloride for one hour at reflux temperature. Twenty-seven grams (0.068 mole) of the oily compound obtained in the previous reaction were added with 9 g. (0.15 mole) of urea to the prepared magnesium methoxide. The reaction mixture was stirred, refluxed for a period of 20 hours, cooled, with stirring, diluted with 100 ml. of ethyl acetate and acidified with 6 N hydrochloric acid. The aqueous phase was separated and re-extracted with 100 ml. of ethyl acetate. The ethyl acetate extracts were combined, cooled and extracted twice with 80 ml. of 5 percent sodium hydroxide. The alkaline solution was quickly separated and acidified with ice cold 6 N hydrochloric acid. The crystalline precipitate was filtered and crystallized from water-methanol to yield 5-(4-benzyloxy-3-methoxyphenyl) - 5 - (2 - propynyl)barbituric acid having a melting point of 219–221°.

EXAMPLE 22

Tablet formulation

| | Per tablet, mg. |
|---|---|
| 5-allyl-5-(3,4-dimethoxyphenyl) barbituric acid | 25.00 |
| Lactose, U.S.P. | 64.50 |
| Corn starch | 10.00 |
| Magnesium stearate | 0.50 |

Procedure

Twenty-five parts of 5-allyl-5-(3,4-dimethoxyphenyl) barbituric acid are mixed with 64.5 parts of lactose, 10 parts of corn starch and .5 part of magnesium stearate in a suitable mixer. The mixture is further blended by passing through a Fitzpatrick Comminuting Machine fitted with a No. 1A screen, knives forward. The mixed powders are slugged on a tablet compressing machine. Thereafter, the slugs are comminuted to a suitable mesh size (No. 16 screen) and mixed well. The tablets are compressed at a tablet weight of 100 mg. using tablet punches having a diameter of approximately ¼". Tablets may be either flat or biconvex and may be scored if desired.

EXAMPLE 23

Tablet formulation

| | Per tablet, mg. |
|---|---|
| 5-allyl-5-(3,4-dimethoxyphenyl)barbituric acid | 100 |
| Lactose, U.S.P. | 202 |
| Corn starch, U.S.P. | 80 |
| Prehydrolyzed corn starch | 20 |
| Calcium stearate | 8 |
| Total weight | 410 |

Procedure 100 parts of 5-allyl-5-(3,4-dimethoxyphenyl)barbituric acid, 202 parts of lactose, 80 parts of corn starch and 20 parts of prehydrolyzed corn starch (Amijel BO11—Corn Products Company, New York), are blended in a suitable mixer. The mixture is granulated to a heavy paste with water and the moist mass is passed through a No. 12 screen and dried overnight at 110° F. The dried granules are passed through a No. 16 screen and transferred to a suitable mixer. Eight parts of calcium stearate are added to the granules, which are mixed until uniform. The mixture is compressed at a tablet weight of 410 mg. using tablet punches having a diameter of approximately ⅜". Tablets may be either flat or biconvex and may be scored if desired.

EXAMPLE 24

Capsule formulation

| | Per capsule, mg. |
|---|---|
| 5-allyl-5-(3,4-dimethoxyphenyl)barbituric acid | 100 |
| Lactose | 83 |
| Corn starch | 37 |
| Talc | 5 |
| Total weight | 225 |

Procedure 100 parts of 5-allyl-5-(3,4-dimethoxyphenyl)barbituric acid, 83 parts of lactose and 37 parts of corn starch are mixed in a suitable mixer. The mixture is further blended by passing through a Fitzpatrick Comminuting Machine with a No. 1A screen, knives forward. The blended powder is returned to the mixer, and 5 parts of talc are added and blended thoroughly. The mixture is then filled into No. 4 hard shell gelatin capsules on a Parke Davis capsulating machine.

EXAMPLE 25

Capsule formulation

| | Per capsule, mg. |
|---|---|
| 5-allyl-5-(3,4-dimethoxyphenyl)barbituric acid | 50 |
| Lactose, U.S.P. | 125 |
| Corn starch, U.S.P. | 30 |
| Talc, U.S.P. | 5 |
| Total weight | 210 |

13

Procedure

Fifty parts of 5-allyl-5-(3,4-dimethoxyphenyl)barbituric acid are mixed with 125 parts of lactose and 30 parts of corn starch in a suitable mixer. The mixture is further blended by passing it through a Fitzpatrick Comminuting Machine with a No. 1A screen, knives forward. The blended powder is returned to the mixer, and 5 parts of talc are added and blended thoroughly. The final mixture is filled into No. 4 hard shell gelatin capsules on a Parke Davis capsulating machine.

EXAMPLE 26

Suppository formulation

| | Per 1.3 gm. suppository, gm. |
|---|---|
| 5-allyl-5-(3,4-dimethoxyphenyl)barbituric acid | 0.025 |
| Hydrogenated coconut oil | 1.230 |
| Carnauba wax | 0.045 |

Procedure 123 parts of hydrogenated coconut oil (Wecobee M—E. F. Drew Company, New York), and 4.5 parts of carnauba wax are melted in a suitable size glass-lined container, mixed well and cooled to 45° C. 2.5 parts of 5-allyl-5-(3,4-dimethoxyphenyl) barbituric acid, previously reduced to a fine powder with no lumps, is stirred until completely and uniformly dispersed. The mixture is poured into suppositary molds to yield suppositories having an individual weight of 1.3 gms. The suppositories are cooled, removed from the molds, and individually wrapped in wax paper for packaging.

EXAMPLE 27

Parenteral formulation

| | Per ml. |
|---|---|
| 5-allyl-5-(3,4-dimethoxyphenyl) barbituric acid | mg 5.0 |
| Propylene glycol | ml 0.5 |
| Benzyl alcohol (benzaldehyde free) | ml 0.015 |
| Ethanol, 95 percent, U.S.P. | ml 0.10 |
| Water for injection, q.s. 1 ml. | |

Procedure (for 10,000 ml.)

Fifty grams of 5-allyl-5-(3,4-dimethoxyphenyl)barbituric acid are dissolved in a mixture of 150 ml. of benzyl alcohol, 5000 ml. of propylene glycol and 1000 ml. of ethanol. The solution is brought up to final volume of 10,000 ml. with water for injection and filtered through an O2 Selas candle. Thereafter, the solution is filled into suitable size ampuls gassed with nitrogen, sealed and autoclaved at 10 p.s.i. for 30 minutes.

EXAMPLE 28

Parenteral formulation

| | Per cc. |
|---|---|
| 5-allyl-5-(3,4-dimethoxyphenyl) barbituric acid | mg 25 |
| Disodium edetate, U.S.P. | mg 0.1 |
| Sodium hydroxide, ad. pH, 10. | |
| Water for injection, q.s. ad. 1.0 ml. | |

Procedure 2.5 grams of 5-allyl-5(3,4-dimethoxyphenyl)barbituric acid and 10 milligrams of disodium edetate are dissolved in 50 ml. of the water for injection and the pH brought to pH 10 with sodium hydroxide. The solution is then brought to final volume of 100 ml. with water for injection. The solution is filtered, allowed to stand for 24 hours, and thereafter filtered through an O2 Selas candle. The solution is filled into the desired size ampuls and sealed under an atmosphere of nitrogen. The ampuls are sterilized for 20 minutes at 250° F. All ampuls are inspected, and those containing excessive amounts of fibers were rejected.

14

What is claimed is:
1. A compound selected from the group consisting of compounds characterized by the formula

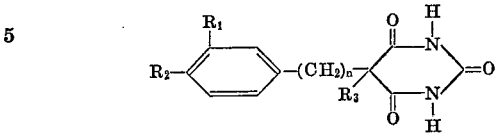

wherein $R_1$ and $R_2$ are independently selected from the group consisting of hydroxy, straight chain lower alkoxy of 1–7 carbon atoms and benzyloxy; $R_3$ is selected from the group consisting of hydrogen, straight chain lower alkenyl of 2–7 carbon atoms and straight chain lower alkynyl of 2–7 carbon atoms; $n$ is an integar from 0 to 2, and salts thereof with pharmaceutically acceptable bases.

2. A compound in accordance with claim 1 wherein $R_3$ is hydrogen.

3. A compound in accordance with claim 1 wherein $n$ is 0.

4. A compound in accordance with claim 2, 5-(3,4-dimethoxyphenyl)barbituric acid.

5. A compound selected from the group consisting of compounds characterized by the formula

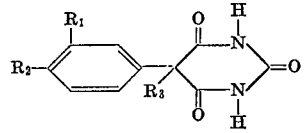

wherein $R_1$ and $R_2$ are independently selected from the group consisting of hydroxy, straight chain lower alkoxy of 1–7 carbon atoms and benzyloxy; $R_3$ is lower alkyl of 1–7 carbon atoms, and salts thereof with pharmaceutically acceptable bases.

6. A compound in accordance with claim 5, 5-(3,4-dimethoxyphenyl)-5-methyl barbituric acid.

7. A compound in accordance with claim 5, 5-(3,4-dimethoxyphenyl)-5-ethyl barbituric acid.

8. A compound in accordance with claim 5, 5-(3,4-dimethoxyphenyl)-5-propyl barbituric acid.

9. A compound in accordance with claim 5, 5-(3,4-dimethoxyphenyl)-5-isopropyl barbituric acid.

10. A compound in accordance with claim 5, 5-(3-benzyloxy-4-methoxyphenyl)-5-ethyl barbituric acid.

11. A compound in accordance with claim 5, 5-ethyl-5-(3-hydroxy-4-methoxyphenyl)barbituric acid.

12. A compound in accordance with claim 5, 5-3,4-diethoxyphenyl)-5-ethyl barbituric acid.

13. A compound in accordance with claim 1 wherein $R_3$ is straight chain lower alkenyl of 2–7 carbon atoms.

14. A compound in accordance with claim 13, 5-allyl-5-(3,4-dimethoxyphenyl)barbituric acid.

15. A compound in accordance with claim 13, 5-allyl-5-(4-benzyloxy-3-methoxyphenyl)barbituric acid.

16. A compound in accordance with claim 13, 5-allyl-5-(3,4-dimethoxyphenethyl)barbituric acid.

17. A compound in accordance with claim 13, 5-allyl-5-(4-hydroxy-3-methoxyphenyl)barbituric acid.

18. A compound in accordance with claim 1 wherein $R_3$ is straight chain alkynyl of 2–7 carbon atoms.

19. A compound in accordance with claim 18 5-(3,4-dimethoxyphenyl)-5-(2-propynyl)barbituric acid.

20. A compound in accordance with claim 18, 5-(4-benzyloxy - 3 - methoxyphenyl)-5-(2-propynyl)barbituric acid.

21. A compound in accordance with claim 18, 5-(3,4-dimethoxyphenethyl)-5-(2-propynyl)barbituric acid.

22. A compound in accordance with claim 18, 5-(4-hydroxy - 3 - methoxyphenyl)-5-(2-propynyl)barbituric acid.

(References on following page)

References Cited

J. P. Trivedi et al. Barbiturates, Part II. 5-Methyl-5-Substituted Benzyl Barbiturates and Thiobarbiturates. Journal of Indian Chem. Society, vol. 35, No. 9, 1958 (pp. 687–9 relied on).

ALEX MAZEL, Primary Examiner

A. M. T. TIGHE, Assistant Examiner

U.S. Cl. X.R.

260—258, 473, 521; 424—254